United States Patent [19]
Hara et al.

[11] Patent Number: 5,283,817
[45] Date of Patent: Feb. 1, 1994

[54] CORDLESS KEY TELEPHONE SYSTEM FOR COVERING MULTIPLE SERVICE AREAS HAVING EXCLUSIVELY ASSIGNED CONTROL CHANNELS

[75] Inventors: Toshihiro Hara; Yukihiro Shimura; Shinji Kumataka; Kosuke Hashimoto, all of Tokyo, Japan

[73] Assignee: NEC Corporation, Tokyo, Japan

[21] Appl. No.: 686,469

[22] Filed: Apr. 17, 1991

[30] Foreign Application Priority Data

Apr. 17, 1990 [JP] Japan ................. 2-100617
Apr. 17, 1990 [JP] Japan ................. 2-100618

[51] Int. Cl.⁵ ................................. H04M 11/00
[52] U.S. Cl. ........................... 379/61; 379/58; 379/63; 379/156
[58] Field of Search .......... 379/58, 59, 60, 61, 379/63, 156; 455/33.1, 34.1, 34.2, 33.2

[56] References Cited

U.S. PATENT DOCUMENTS

| | | | |
|---|---|---|---|
| 4,485,486 | 11/1984 | Webb et al. | 455/33.3 |
| 4,939,785 | 7/1990 | Muratq et al. | 379/63 |
| 5,005,014 | 4/1991 | Jasinski | 379/59 |
| 5,014,295 | 5/1991 | Kunihiro | 379/61 |
| 5,101,500 | 3/1992 | Marui | 379/60 |

Primary Examiner—Jin F. Ng
Assistant Examiner—George J. Oehling
Attorney, Agent, or Firm—Sughrue, Mion, Zinn, Macpeak & Seas

[57] ABSTRACT

In a cordless key telephone system for covering multiple service areas, access units are divided into groups corresponding respectively to the service areas, the access units of each group being located in the corresponding service area for broadcasting a recurrent sequence of address signals on a two-way radio control channel and carrying speech signals on an assigned two-way telephone channel. The access units of each group has a uniquely assigned control channel different in frequency from the control channel of the other group. Cordless stations are switchable to the control channel of a first group of the access units for detecting an address signal and subsequently switchable to the control channel of the access units of a second group if the address signal is not detected in a first sequence for detecting the addressed signal in a second sequence. A main controller is coupled to a switched telephone network for causing the access units to broadcast the address signals in response to an incoming call from the network and for establishing a connection between the network and one of the cordless stations.

5 Claims, 10 Drawing Sheets

ACCESS UNIT 4k

CORDLESS STATION 5

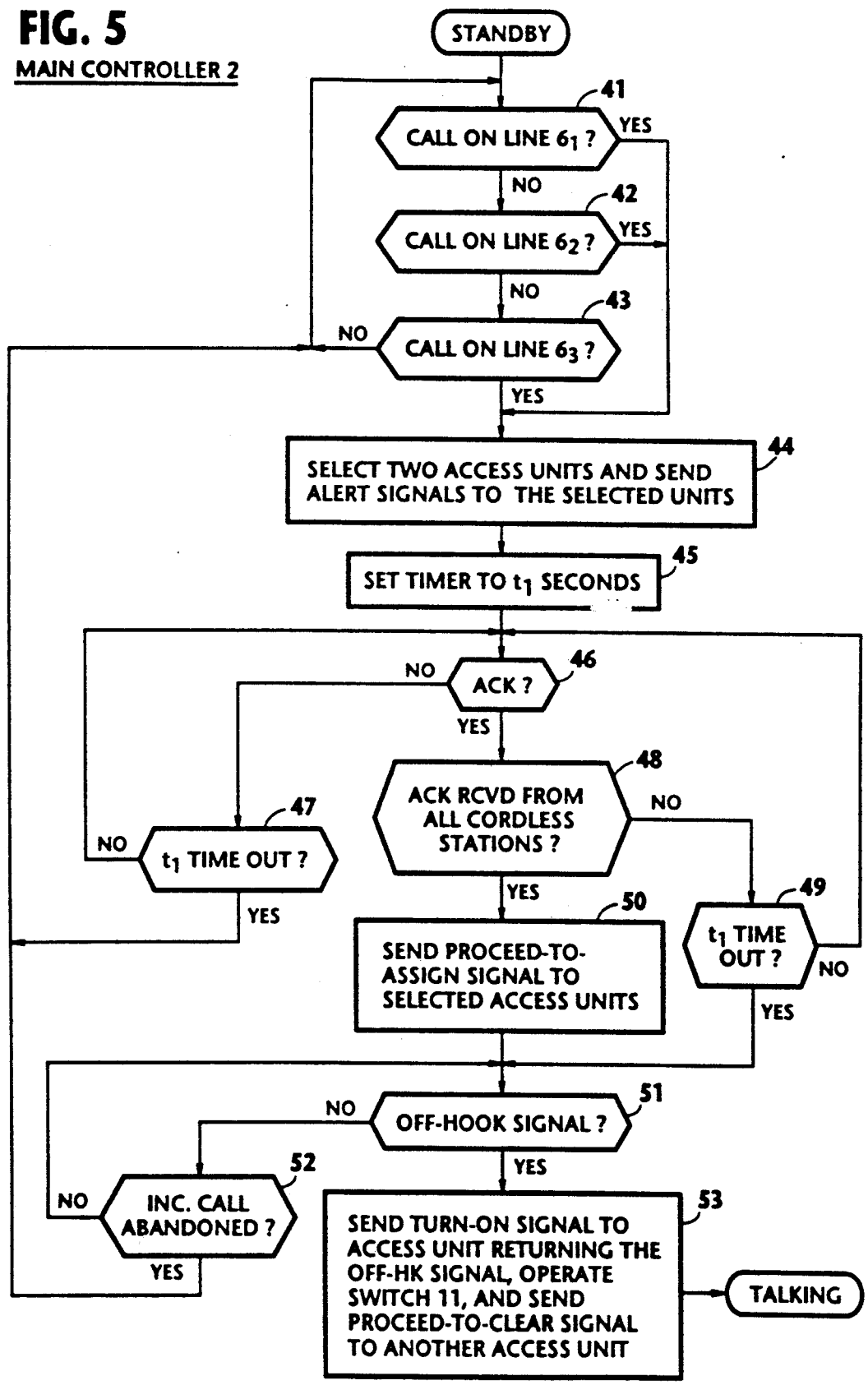

ACCESS UNIT 4

ACCESS UNIT 4

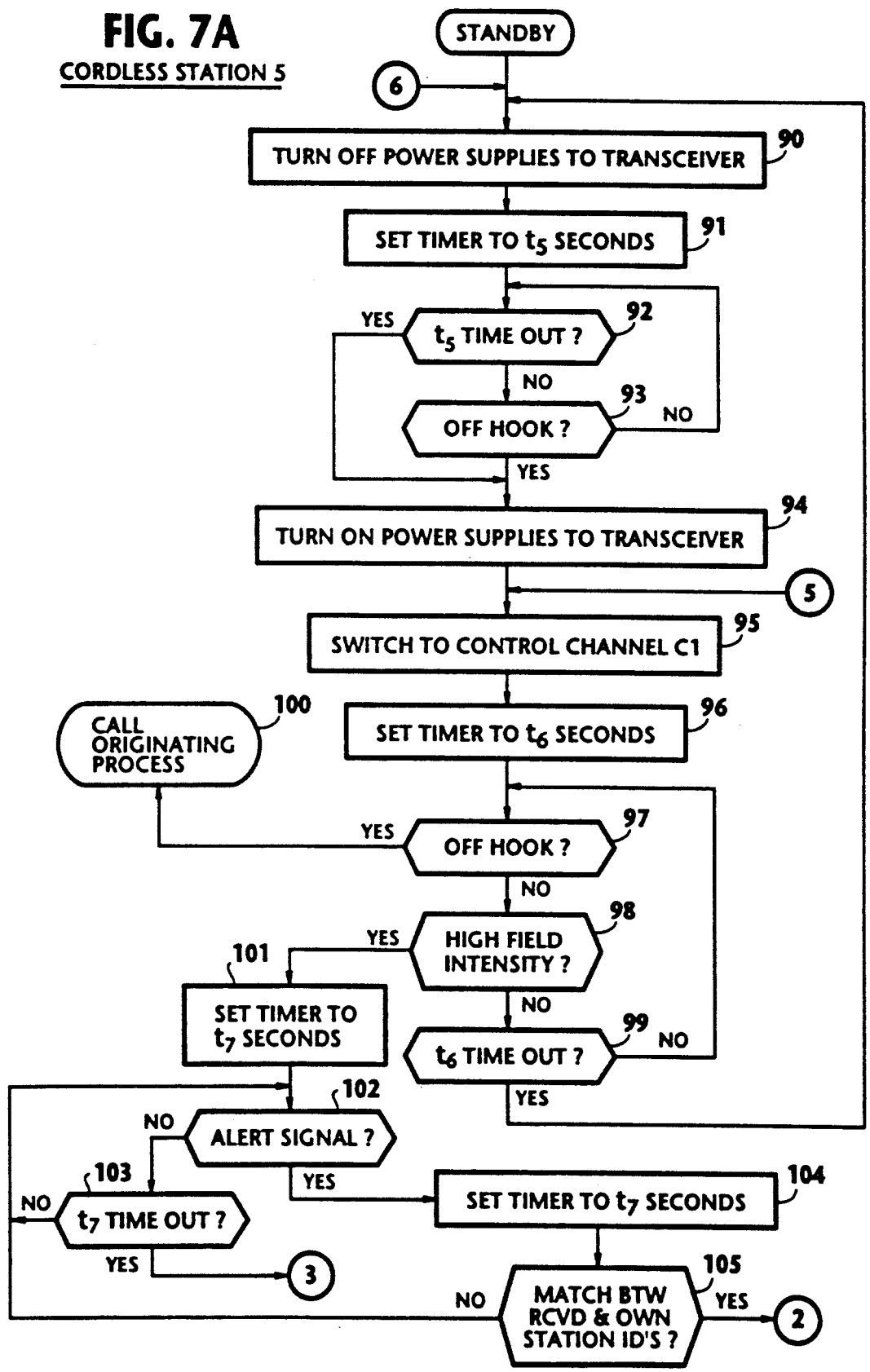

CORDLESS STATION 5

CORDLESS STATION 5

CORDLESS KEY TELEPHONE SYSTEM FOR COVERING MULTIPLE SERVICE AREAS HAVING EXCLUSIVELY ASSIGNED CONTROL CHANNELS

BACKGROUND OF THE INVENTION

The present invention relates to a cordless key telephone system.

Cordless key telephone systems have been in use today replacing wired key telephone systems as they considerably reduce the amount of cables and wires laid on office floors the arrangement of which must be altered to meet current needs of working environment. The system includes a main controller which is coupled to the public or private switched telephone network via subscriber loops to receive incoming calls and originate outgoing calls. The floor space which the system covers is divided into several service areas. One or more access units are located in each service area and coupled to the main controller to exchange control signals with it. The system has only one control channel for exchanging control signals between the access units and cordless stations and several speech channels for transmitting ringing signals and speech signals. In response to an incoming call, the main controller selects one access unit for each service area and sends an alert signal to it over the control channel. Each selected access unit then broadcasts a recurrent sequence of alert signals respectively containing the identifiers of all standby cordless stations to elicit a response therefrom. Each standby cordless station responds to the alert signal addressed to it by returning an acknowledgment signal containing it in the own station identifier as well as the system identifier.

However, since the boundaries between adjacent service areas are not sharply defined, the adjacent areas tend to partially overlap with each other, creating an area in which collision is likely to occur between control signals transmitted from the access units of the adjacent area when an incoming call is received.

Interference between control channel and speech channels is another problem. If the control channel is severely affected by noise from adjacent channels due to intermodulation distortion, an undesirable situation can occur.

SUMMARY OF THE INVENTION

It is therefore an object of the present invention to provide a cordless key telephone system having multiple control channels assigned respectively to different service areas to avoid collision between control signals received in the overlapping area.

According to the present invention, there is provided a cordless key telephone system for covering a plurality of service areas. The system includes a plurality of access units divided into groups corresponding respectively to the service areas. The access units of each group are located in the corresponding service area for broadcasting a recurrent sequence of address signals on a two-way radio control channel and carrying speech signals on an assigned two-way telephone channel. The access units of each group has a uniquely assigned control channel different in frequency from the control channel of the other group. Cordless stations are switchable to the control channel of a first group of the access units for detecting an address signal broadcast therefrom and subsequently switchable to the control channel of the access units of a second group if the address signal is not detected in a first sequence of transmission for detecting the addressed signal in a second sequence of transmission. A main controller is coupled to a switched telephone network for causing the access units to broadcast the address signals in response to an incoming call from the network and establishing a connection between the network and one of the cordless stations.

In order to avoid interference between control channels and speech channels, the frequency spectrum of radio signals used by the system is equally divided into a plurality of channels of bandwidth corresponding to telephone speech quality. Odd-numbered channels are assigned to the access units of the first group as speech channels and an even-numbered channel is assigned to the first group access units as a first control channel. Even-numbered channels are assigned to the access units of the second group as speech channels and an odd-numbered channel is assigned to the second group access units as a second control channel. The first control channel is excluded from the speech channels assigned to the second group access units, the second control channel being excluded from the speech channels assigned to the first group access units.

BRIEF DESCRIPTION OF THE DRAWINGS

The present invention will be described in further detail with reference to the accompanying drawings, in which:

FIG. 5 shows a sequence of programmed instructions performed by the main controller;

FIGS. 7A to 7C show a sequence of programmed instructions performed by the cordless stations;

DETAILED DESCRIPTION

Figure 1:
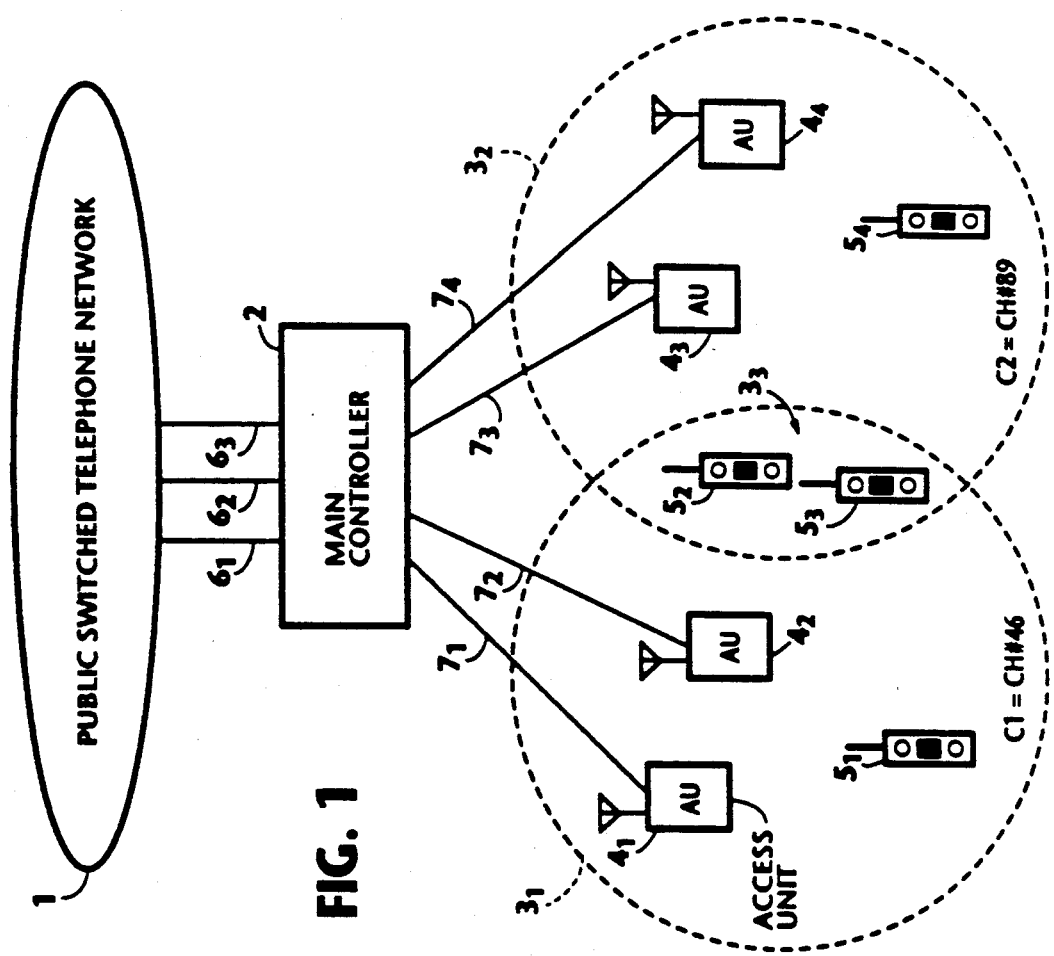
FIG. 1 shows in block form a cordless key telephone system embodying the present invention.

Referring now to FIG. 1, there is shown a cordless key telephone system according to the present invention. The system includes a main controller 2 connected to the public telephone network 1 via three subscriber lines $6_1$ through $6_3$, for example. Main controller 2 is further connected by local lines $7_1 \sim 7_4$ to access units $4_1 \sim 4_4$ which are divided into groups corresponding to service areas $3_1$ and $3_2$ and located at strategic points of the corresponding service areas. The system has four cordless stations $5_1$ through $5_4$, for example, which may roam across the boundaries between service areas $3_1$ and $3_2$. A two-way control channel is provided between the access units and cordless stations. During standby modes, all access units and cordless stations are switched to the control channel to constantly monitor the signals carried on that channel. During a call origination or termination phase, the control channel is used to exchange control signals to assign a two-way speech channel.

The frequency spectrum of the radio signals used in the system is equally divided at 12.5-kHz intervals into 89 (eighty-nine) telephone channels each with a bandwidth of 4 kHz. In order to avoid interference between control signals and speech signals due to third-order intermodulation distortion, service area $3_1$ is permanently assigned an even-numbered control channel C1, say, channel #46 and a plurality of odd-numbered speech channels from channel #1 to channel #87, while service area $3_2$ is permanently assigned an odd-numbered control channel C2, say, channel #89, and a plurality of even-numbered speech channels from channel #2 to channel #88 with the exception of channel #46. The system has an overlapping area shown at $3_3$ in FIG. 1 in which signals from the access units of adjacent areas $3_1$ and $3_2$ are simultaneously received.

Figure 2:
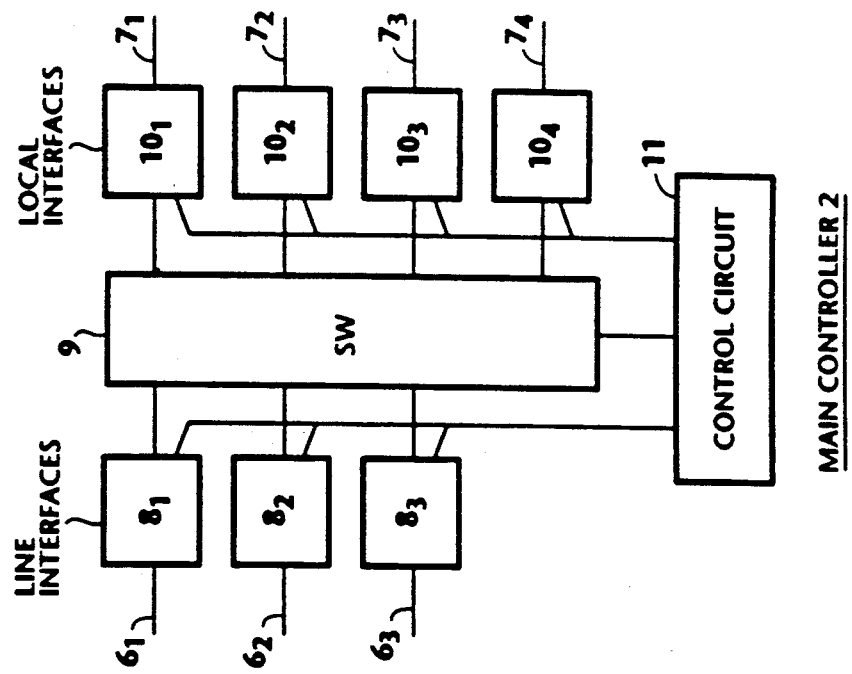
FIG. 2 shows details of a main controller.

As shown in FIG. 2, main controller 2 comprises line interfaces $8_1 \sim 8_3$ respectively coupled via subscriber lines $6_1 \sim 6_3$ to the network 1, local interfaces $10_1 \sim 10_4$ respectively coupled to local lines $7_1 \sim 7_4$, and a switching matrix 9 for establishing a connection between the interfaces 8 and 10. A control circuit 11 is coupled to all interfaces 8 and 10 to supply a switching control signal to matrix 9 in a manner as will be described.

Figure 3:
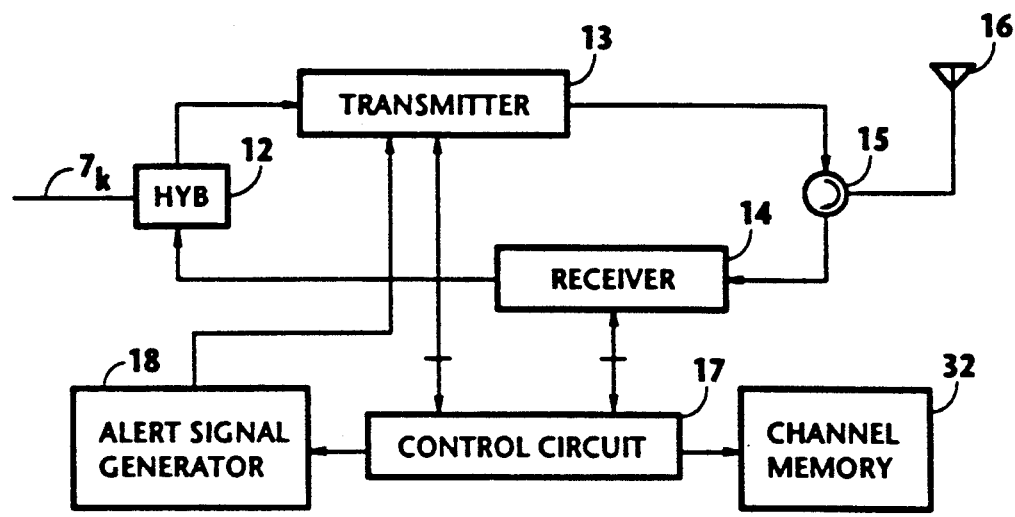
FIG. 3 shows details of an access unit.

As illustrated in FIG. 3, each access unit $4_k$ includes a hybrid 12 having its two-wire circuit coupled to the associated local line $7_k$. The transmit portion of the four-wire circuit is coupled to the input of a transmitter 13, the receive portion of the four-wire circuit being coupled to the output of a receiver 14. The output of transmitter 13 is coupled via a duplexer 15 to an antenna 16 for transmission to cordless stations. Signals received by antenna 16 from cordless stations are coupled by duplexer 15 to the input of receiver 14 for transmission to main controller 2. A frequency synthesizer is included in transmitter 13 and receiver 14 to receive control signals transmitted on the control channel from both sides of the access unit for coupling to a control circuit 17. In a manner to be described, control circuit 17 processes the received control signals and generates control signals for transmission to either side of the unit. An alert signal generator 18 is connected to the control circuit to generate station alert signals in succession to all cordless stations of the system in response to an enable signal from control circuit 17. Each alert signal contains the system identifier and the identifier of each cordless station. The output of alert signal generator 18 is applied to transmitter 13 for transmission to cordless stations.

The frequency synthesizers of access units $4_1$ and $4_2$ are switched to channel #46 and those of access units $4_3$ and $4_4$ are switched to channel #89 for their exclusive use for control purposes and are switched to an idle speech channel which is spaced at sufficient distances from other active speech channels to ensure against interference between them.

Figure 9:
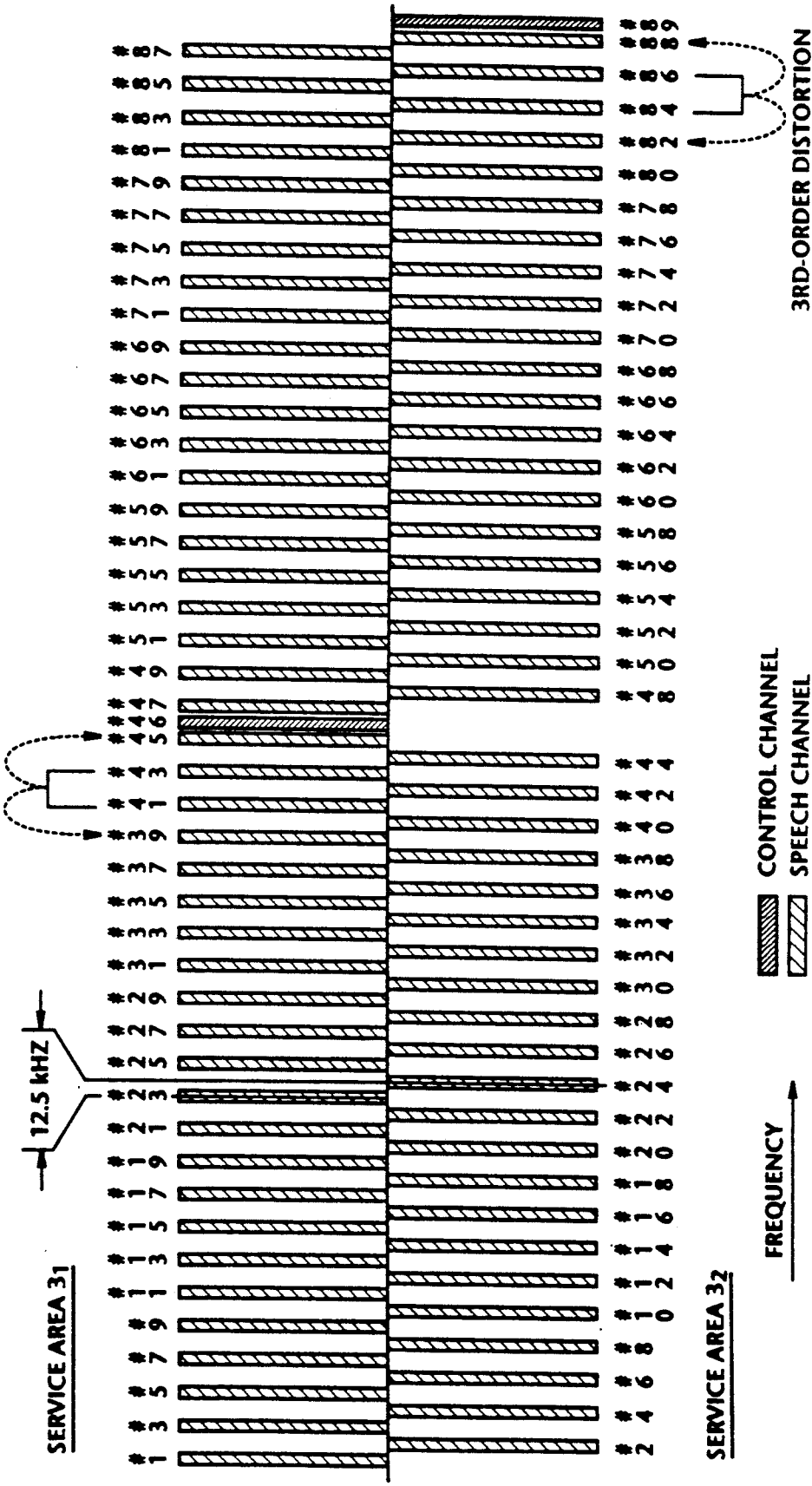
FIG. 9 shows a channel assignment plan according to this invention.

To avoid adjacent channel interference, control channels and speech channels are permanently assigned to the access units according to a channel assignment plan shown in FIG. 9. Access units $4_1$ and $4_2$ for service area $3_1$ are provided with a channel memory 32 which is coupled to control circuit 17 to store the busy/idle status of the odd-numbered speech channels #1 through #87. Likewise, access unit $4_3$ and $4_4$ for service area $3_2$ are provided with a similar memory 32 for storing the busy/idle status of even-numbered speech channels #2 through #44 and #48 through #88. When selecting a speech channel, control circuit 17 addresses the memory 32 to detect idle speech channels and selects one from the detected idle channels.

The use of any pair of neighboring channels with frequencies $f_1$ and $f_2$, respectively, causes third-order intermodulation distortion to occur on two channels with frequencies $(2f_1-f_2)$ and $(2f_2-f_1)$, respectively.

In the case of service area $3_1$ in which even-numbered control channel (#46) is permanently assigned, the simultaneous use of channels #41 and #43 cause channels #39 and #37 on their lower side are affected by third-order intermodulation distortion, and their use is avoided. Whereas, even-numbered channels #38, #40, #42 #44 and 46 (control channel) are free from such distortions. Likewise, in service area $3_2$ in which odd-numbered control channel (#89) is permanently assigned, the use of channels #82, #86 and #88 is avoided if channels #84 and #86 are simultaneously in use. Control channel #89 is not affected by the third-order intermodulation distortion caused by the use of any pair of even-numbered channels. For service area $3_1$, channel selection is made by avoiding channels having a channel number $(4n-2m+1)$ and a channel number $(4m-2n+1)$ if channels identified by numbers $(2n+1)$ and $(2m+1)$ are simultaneously in use, where n and m are positive integers. For service area $3_2$, channel selection is made by avoiding channels having a channel number $(4n-2m)$ and a channel number $(4m-2n)$ if channels identified by numbers 2n and 2m are simultaneously in use.

Figure 4:
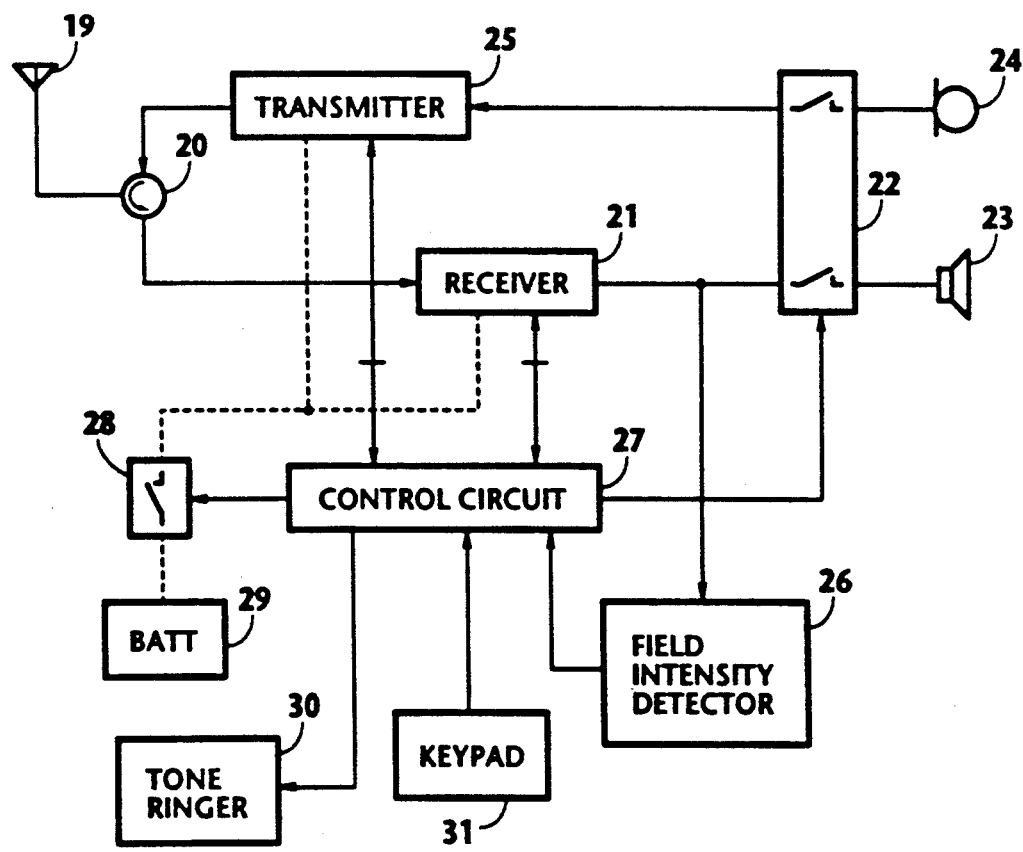
FIG. 4 shows details of a cordless station.

In FIG. 4, signal from the nearby access unit is detected by an antenna 19 of each cordless station $5_k$ and passed through a duplexer 20 to a receiver 21 where it is converted to an audio-frequency signal and applied through a normally open switching circuit 22 to an earphone 23. Signal from microphone 24 is coupled through switching circuit 22 to a transmitter 25 where it is converted to a high-frequency signal and applied through duplexer 20 to antenna 19. A field intensity detector 26 is connected to receiver 21 to compare the field intensity of the cordless station with a prescribed threshold and applies an output signal to a control circuit 27 if the field intensity is higher than the threshold. As will be described, control circuit 27 exchanges control signals with receiver 21 and transmitter 25 by successively tuning their frequency synthesizers to control channels #46 and #89 and switching to an idle speech channel when it is assigned by the communicating access unit. For power savings purposes, a power switch 28 is controlled by control circuit 27 to cut off power supplies from a battery 29 to receiver 21 and transmitter 25. A tone ringer 30 is connected to control circuit 27 to audibly alert the user upon receipt of an incoming call from the network. A keypad 31 is also connected to control circuit 27 to generate an off-hook signal when answering an incoming call or generate a connection request as well as destination address information when originating an outgoing call.

Each of the respective control circuits of main controller 2, access units 4 and cordless stations 5 is a microprocessor-based controller which is programmed to perform a stored sequence of instructions as described hereinbelow.

FLOWCHARTS

In FIG. 5, main controller 2 initiates program execution with sequential steps 41, 42 and 43 which check in succession for the presence of an incoming call from the network on one of subscriber lines $6_1$, $6_2$ and $6_3$. If there is one, control proceeds to step 44 to select two access units one for each service area and send a first alert signal to both of the selected access units in order to wait for copied versions of acknowledgment (ACK) signals from cordless stations which are in a standby state. As will be described, each access unit responds to this alert signal by broadcasting a recurrent sequence of second alert signals containing respective identifiers of all standby cordless stations to notify the arrival of an incoming call, not knowing which cordless stations are within their own service area. Therefore, as many ACK signals are returned from each access unit as there are standby cordless stations within the service area of the access unit.

Following step 44, a timer is set equal to a period of $t_1$ seconds (step 45) and a check is made for the presence of an acknowledgment signal (ACK) from access units 4 (step 46). If there is none, control repeats step 46 after checking for the expiration of timeout period $t_1$ (step 47), and if there is one, exit is to step 48 to check to see if ACK signals are received from all standby cordless stations. If the answer is negative, steps 46 and 48 are repeated until the timeout period $t_1$ expires (step 49), and if the answer is affirmative, control moves ahead to step 50 to send a proceed-to-assign signal to the selected access units, and proceeds to decision step 51 to check to see if an off-hook signal is returned from one of the selected access units. If the timeout period $t_1$ expires at step 47, control returns to step 41 to repeat the process, and if it expires at step 49, control exits to step 51.

As will be described, the proceed-to-assign signal allows each access unit to assign an idle speech channel to the incoming call and to switch the access unit and cordless stations to the assigned speech channel so that the cordless stations can receive ringing signals from the access unit.

If the answer is negative in step 51, this step is repeated until the incoming call is abandoned from the network side of the connection (step 52), and if the answer is affirmative, control advances to step 53 to transmit a speech-circuit turn-on signal (containing in it the system identifier and the identifier of the station from which the off-hook signal has returned) to the access unit which has returned the off-hook signal, operates matrix switch 9 to establish a connection to trip the ringing signal from the network, and transmits a proceed-to-clear signals to the other of the selected access units in order to clear ringing signals supplied from it to cordless stations. Following step 53, main controller 2 enters a talking mode with respect to the incoming call.

Figure 6A:
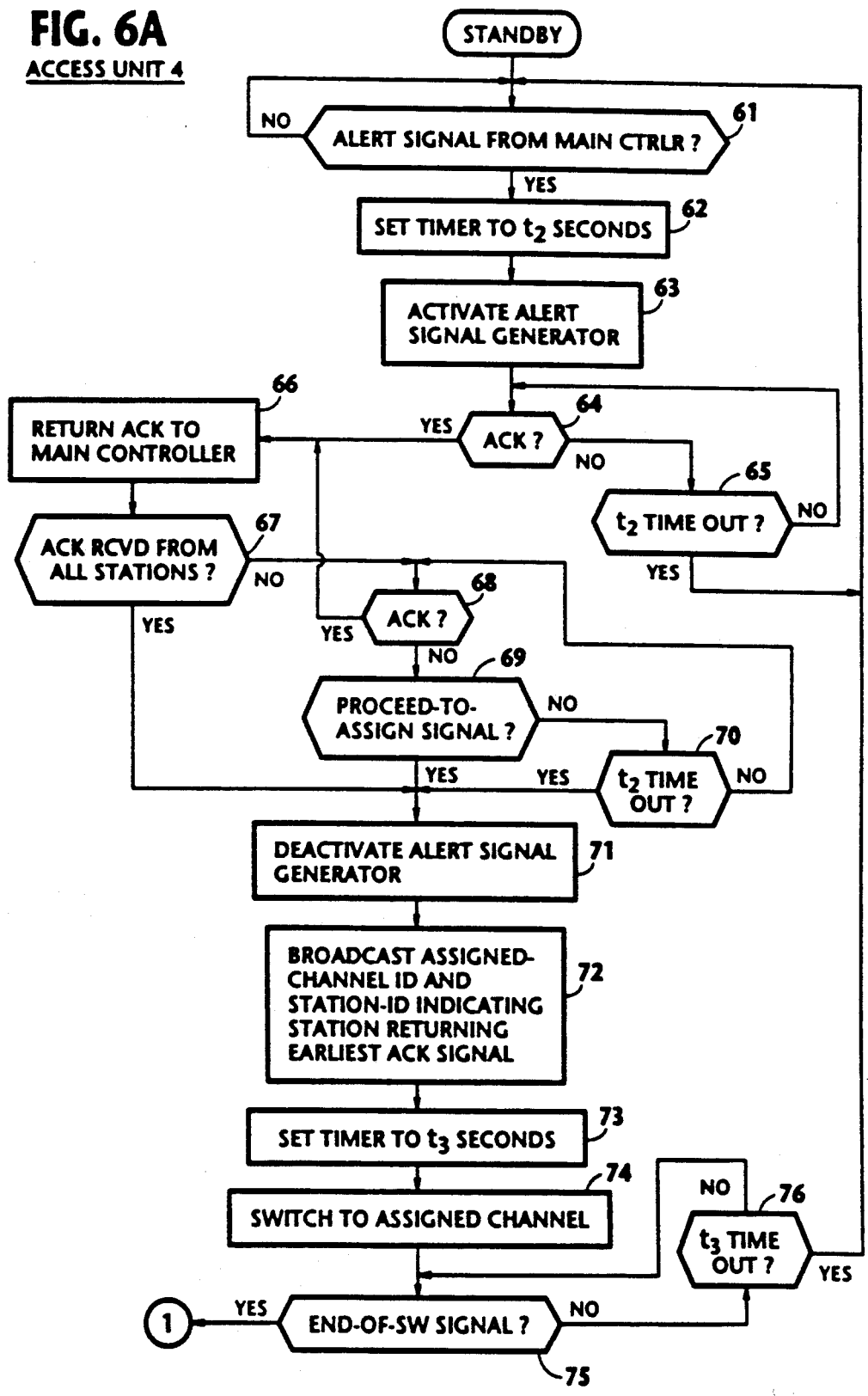
FIGS. 6A and 6B show a sequence of programmed instructions performed by the access units.

In FIG. 6A, if an access unit 4 is in a standby mode, it initiates program execution with step 61 to check for the presence of an alert signal from main controller 2. If the answer is affirmative, exit to step 62 to set a $t_2$-second timeout period and activate the alert signal generator 18 to broadcast station alert signals to all cordless stations (step 63) to elicit a response from each station. Exit then is to step 64 which checks for the presence of an ACK signal from a cordless station which responded to the alert signal addressed to it. If no ACK is received within the $t_2$-second timeout period (steps 64 and 65), control returns to the starting point of the program, recognizing that there is no standby cordless station within the own service area. If the answer in step 64 is affirmative, control goes to step 66 to return an ACK signal to main controller 2 and proceeds to step 67 to check to see if ACK signals are received from all cordless stations of the system. If the answer is negative, control exits to step 68 to repeat a check for the presence of an ACK signal. If there is one, control returns to step 66; otherwise, it advances to step 69 to check to see if a proceed-to-assign signal is received from main controller 2. If the answer is negative, steps 68 and 69 are repeated until the timeout period $t_2$ expires (step 70).

If the decision in step 67, 69 or 70 is affirmative, control advances to step 71 to deactivate the alert signal generator 18. Exit then is to step 72 to broadcast a channel assignment signal containing the identifier of a speech channel to be assigned to the incoming call and the identifier of the cordless station which responded with the earliest of the ACK signals from cordless stations located in the same service area. Exit then is to steps 73 and 74 to set a $t_3$-second timeout period and switch to the assigned speech channel. Control proceeds to step 75 to check for the reception of an end-of-switching signal from the cordless station identified by the channel assignment signal. If this signal is not received within the $t_3$-second timeout period (steps 75 and 76), control returns to the starting point of the program.

If the answer is affirmative in step 75, exit then is to step 77 (FIG. 6B) to broadcast ringing signals in sequence to those cordless stations which returned ACK signals. To avoid undesirable effect caused by a collision between simultaneous occurrences of call answering attempts, the ringing signals contain the respective station identifiers of such cordless stations by allowing only one of the stations to return an off-hook signal. Control goes to step 78 to check for the presence of a proceed-to-clear signal from main controller 2. If this is the case, control exits to step 79 to broadcast a clearing signal to clear the ringing signals. If the answer is negative in step 78, control exits to step 80 to check for the presence of an off-hook signal from a cordless station. Steps 78 and 80 are repeated if no off-hook signal is received. If the answer is affirmative in step 80, exit is to step 81 to return an off-hook signal to main controller 2 to allow it to supply a turn-on signal (step 53, FIG. 5). A $t_4$-second timeout period is then set (step 82). Decision step 83 follows to check for the reception of a turn-on signal from main controller 2. Step 83 is repeated until $t_4$-second timeout period expires (step 84) and exits the loop to enter a standby state. If the answer is affirmative in step 83, step 85 is executed by broadcasting a turn-on signal containing in it the identifier of the cordless station which has transmitted the off-hook signal, and control enters a talking mode.

Figure 7B:
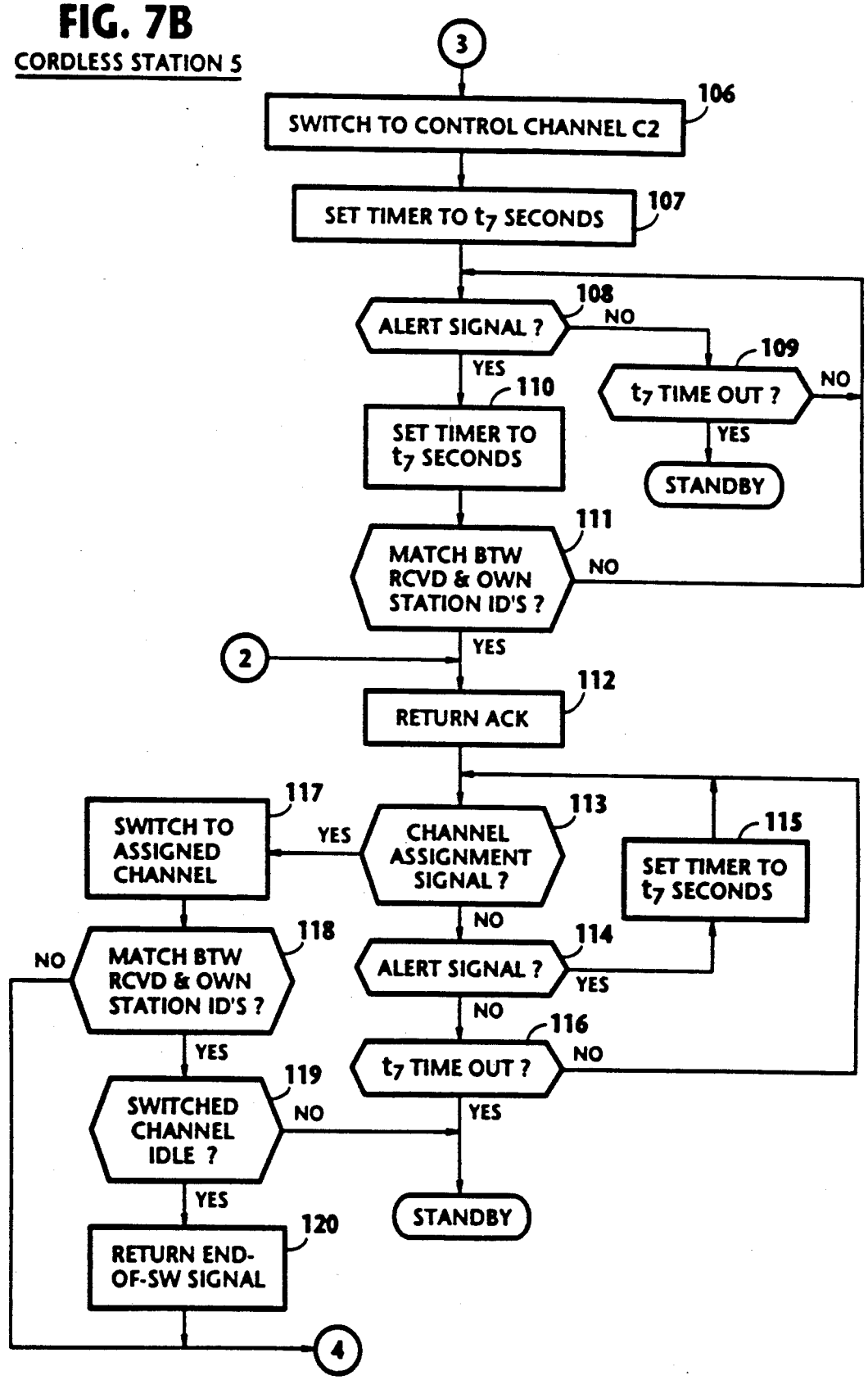

In FIG. 7A, if a cordless station is in a standby mode, it begins its program execution with step 90 by turning off power switch 28 to cut off power supplies to transceiver (transmitter 25 and receiver 21) for battery savings purposes. Exit then is to step 91 to set a $t_5$-second timeout period. Steps 92 and 93 are sequentially executed to check for the expiration of the $t_5$-second timeout period and check to see if the cordless station goes off hook. If the station goes off hook or $t_5$-second period expires before the station goes off hook, control moves ahead to step 94 to turn on power switch 28 to activate the transceiver, and proceeds to step 95 to switch its frequency synthesizers to control channel C1 (=channel #46). A $t_6$-second timeout period is then set (step 96) and the presence of an off-hook condition of the cordless station is again checked (step 97). If the cordless station goes off hook when step 97 is being executed, the user's attempt is a call origination and control moves to a call originating subroutine 100. If no off-hook condition is detected by step 97, a check is made (step 98) for the presence of an output signal from field intensity detector 26 indicating that an incoming call is received. If the answer is negative in step 98, steps 97, 98 are repeated until the $t_6$-second timeout period expires (step 99). If this timeout period expires, control returns to the starting point of the program to repeat the battery savings process.

If the answer is affirmative in step 98, control exits to step 101 to set a $t_7$-second timeout period and goes to step 102 to check for the presence of a station alert signal addressed to the own key telephone system. Since the system has four registered cordless stations, four station alert signals are sequentially received by each cordless station. If no alert signal is received following the generation of an output signal from field intensity detector 26, the $t_7$-second period will expire (step 103) and the station enters a standby mode. If an alert signal is received on control channel C1, exit is to step 104 to set the $t_7$-second timeout period again and proceeds to step 105 to check to see if there is a match between the station identifier contained in the received alert signal and the own station identifier. If there is no match, control returns to step 102 to repeat the process. The timeout period $t_7$ will expire if the alert signal transmitted on control channel C1 is not addressed to the own station during a period following the switching of the station to control channel C1. In this case, control exits to step 112 (FIG. 7B) to return an ACK signal to the access unit. Conversely, if the decision in step 105 is affirmative, exit is to step 106 to switch the station to control channel C2, which is followed by step 107 in which the timer is set to $t_7$ seconds. Control then exits to step 108 to check to see if an alert signal is received on control channel C2. In a manner similar to steps 103 through 105, steps 109 through 111 are executed to determine if the station identifier contained in a received alert signal matches the identifier of the own station during a period $t_7$ subsequent to the first period $t_7$. If an alert signal addressed to the station is not received during the timeout period, control exits from step 109 and enters a standby state. If the answer is affirmative in step 111, control proceeds to step 112 to return an ACK signal.

It is seen that by executing steps 101 through 111 each cordless station is sequentially switched to control channels C1 and C2 for a maximum of interval $t_7$ in search of an alert signal addressed to the station. Note that alert signals having the same station address are repeatedly transmitted on each control channel in rapid succession to increase the likelihood of reception during the timeout period $t_7$. If an alert signal received by a cordless station is the one addressed to that station, the latter remains switched to the control channel on which it received the signal.

The ACK signal contains the system identifier and the identifier of the own cordless station. The transmission of this ACK signal will cause the corresponding access unit to deactivate the alert signal generator 26 (step 71, FIG. 6A) and broadcast a channel assignment signal (step 72).

Exit then is to step 113 to check for the presence of an channel assignment signal from the access unit. If no channel assignment signal is received, control proceeds to step 114 to check for the presence of a station alert signal again. If any of the alert signals of the system is received, the $t_7$-second timeout period is set up again (step 115), with control returning to step 113. If the decisions in steps 113 and 114 are both negative during the $t_7$-timeout period (step 116), control enters a standby state.

Figure 6B:
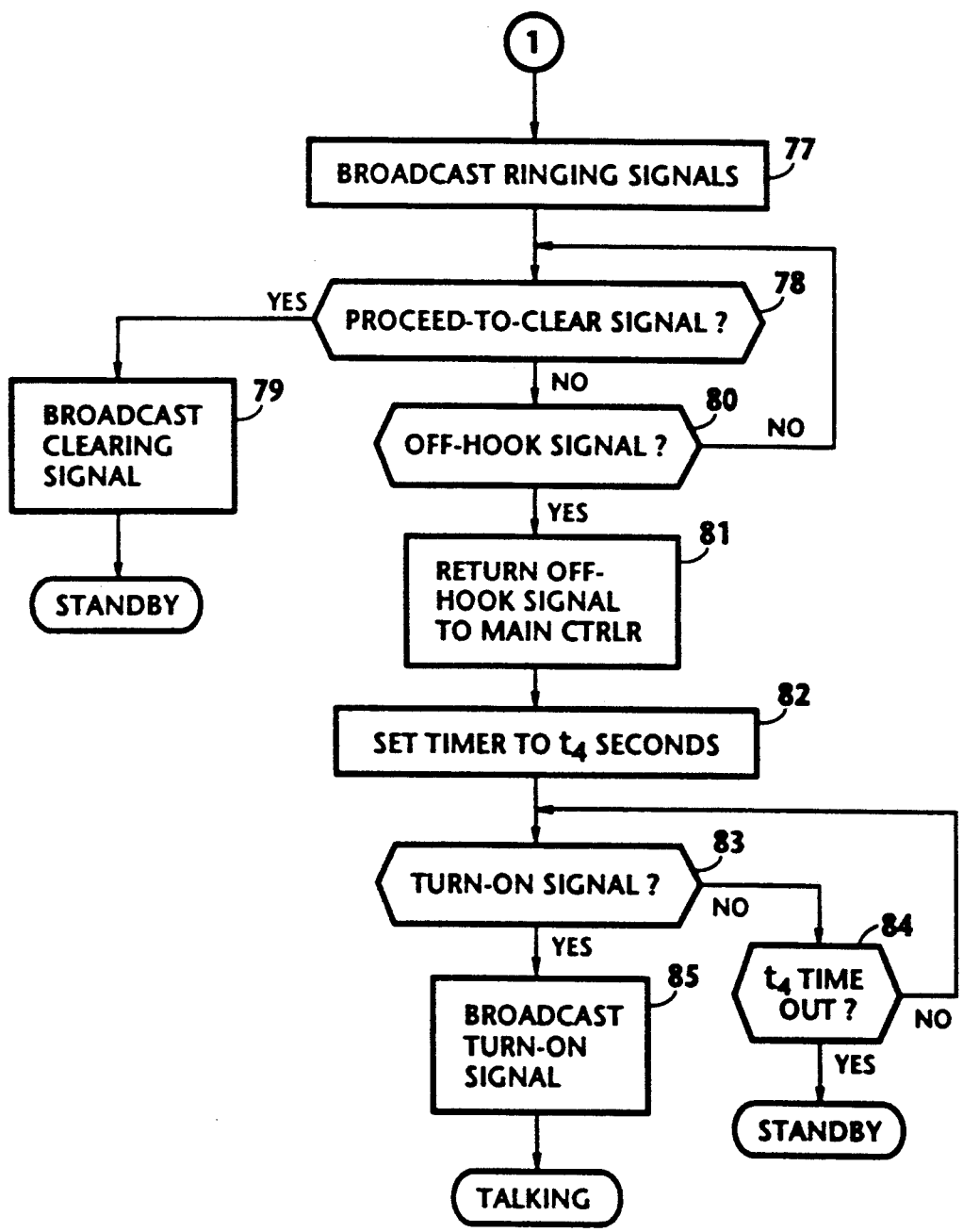

If the decision in step 113 is affirmative, control exits to step 117 to switch the frequency synthesizers of the cordless station to a speech channel specified by the received channel assignment signal. Control then moves to step 118 to check to see if the station identifier contained in the channel assignment signal matches the identifier of the own cordless station. If it is, control advances to step 119 to check to see if the switched speech channel is in an idle state. If not, control enters a standby mode. If the switched speech channel is idle, control exits to step 120 to return an end-of switching signal to the access unit, allowing it to proceed to step 77 to broadcast ringing signals (FIG. 6B).

Exit then is to step 121 (FIG. 7C) to set up a $t_8$-second timeout period for successive detection of a ringing signal (step 122) and a turn-on signal (step 123) and a clearing signal (step 124) until the timeout period of $t_8$ seconds expires (step 126), whereupon control returns to step 95. If the turn-on signal is received (step 123) or if the clearing signal is received (step 124), control proceeds to step 125 for deactivating the tone ringer and returns to step 95. Steps 123 through 126 are executed by stations which did not go off hook. If the ringing signal is received (step 122), control proceeds to step 127 to check to see if the own station goes off hook. If negative decision is made in step 127, control activates tone ringer 30 (step 128) to alert the users, and returns to step 121.

When the station goes off hook, control exits to step 129 to deactivate the tone ringer and proceeds to step 130 to detect a match between the station identifier transmitted by the received ringing signal and the own station identifier. If they fail to match, control returns to step 121, and if a match occurs, control proceeds to step 131 to set the timer to a timeout period of $t_9$ seconds, and proceeds to step 132 to return an off-hook signal containing in it the system identifier and the identifier of the cordless station. Thus, if more than one cordless station goes off hook, the off-hook signal is transmitted only from one of such stations. The transmission of the off-hook signal from the cordless station causes the corresponding access unit to proceed to step 81 (FIG. 6B) to transmit a copy of the received off-hook signal to main controller 2. On receiving this copy of off-hook signal, main controller 2 proceeds to step 53 (FIG. 5) to return a turn-on signal to the access unit containing in it the system identifier and the identifier of the station going off hook, as well as a proceed-to-clear signal. On receiving this turn-on signal (step 83, FIG. 6B), the access unit broadcasts a copy of the received turn-on signal (step 85).

Exit then is to step 133 to check for the presence of a turn-on signal from the access unit. If this signal is not received within the timeout period $t_9$ (step 134), control enters a standby mode, and if it is received within this period, exits to step 135 to check for a match between the station identifier contained in the turn-on signal and the own identifier. If more than one cordless station hooked off in response to a ringing signal, the decision of step 135 in one of such cordless station is negative and affirmative in the other station. If the answer is negative in step 135, control returns to step 95 to switch the cordless station to the control channel in order to receive the next incoming call which may immediately follow, otherwise it exits to step 136 to close the normally open switching circuit 22 and enters a talking mode.

OPERATION

The operation of the system will now be described with reference to the drawings described above together with FIG. 8. Assume that cordless stations $5_1$ and $5_4$ are respectively located in service areas $3_1$ and $3_2$ and the other cordless stations are located in the overlapping area $3_3$, as illustrated in FIG. 1, when an incoming call is received on subscriber line $6_1$ from the network and that all cordless stations are in a standby state executing the battery savings steps 90 to 99.

The incoming call is detected by line interface $8_1$ of main controller 2, and this fact is communicated to control circuit 11 (step 41, FIG. 5), which proceeds to select one access unit for each service area, say, access units $4_1$ and $4_3$ for service areas $3_1$ and $3_2$, respectively, and transmits alert signals to the selected units (step 44) from local interfaces $10_1$ and $10_3$ via local lines $7_1$ and $7_3$. More specifically, the alert signal from local interface $10_1$, for example, is supplied to transmitter 13 of access unit $4_1$ and fed into control circuit 17 (step 61, FIG. 6A) and a recurrent sequence of station alert signals $S_1$, $S_2$, $S_3$ and $S_4$ (FIG. 8) are generated by alert signal generator 18 and broadcast on control channel C1 to cordless stations $5_1$, $5_2$ and $5_3$ following the setup of a $t_2$-second timeout period (steps 62 and 63). Likewise, the same station alert signals are recurrently broadcast from access unit $4_3$ on control channel C2 to cordless stations $5_2$, $5_3$ and $5_4$. Station alert signals $S_1$, $S_2$, $S_3$ and $S_4$ respectively address to all cordless stations $5_1$, $5_2$, $5_3$ and $5_4$ of the system.

Following a battery savings mode, each cordless station is first switched to control channel C1 (step 95, FIG. 7A). If field intensity detector 26 produces a high-intensity signal (step 98), the station alert signals from access unit $4_1$ are detected by antenna 19 and supplied through receiver 21 of each cordless station to control circuit 27 in which their station identifiers are compared successively with the identifier of the own station to detect a match between them (steps 102~105).

Since all stations are initially switched to control channel C1, stations $5_3$ and $5_4$ are insensitive to a first series of alert signals $S_3$ and $S_4$. Station $5_1$ responds to alert signal $S_1$ by returning ACK $T_{11}$, which is copied by access unit $4_1$ and transmitted to main controller 2 as ACK $T_{12}$ (step 66, FIG. 6A).

Figure 8:
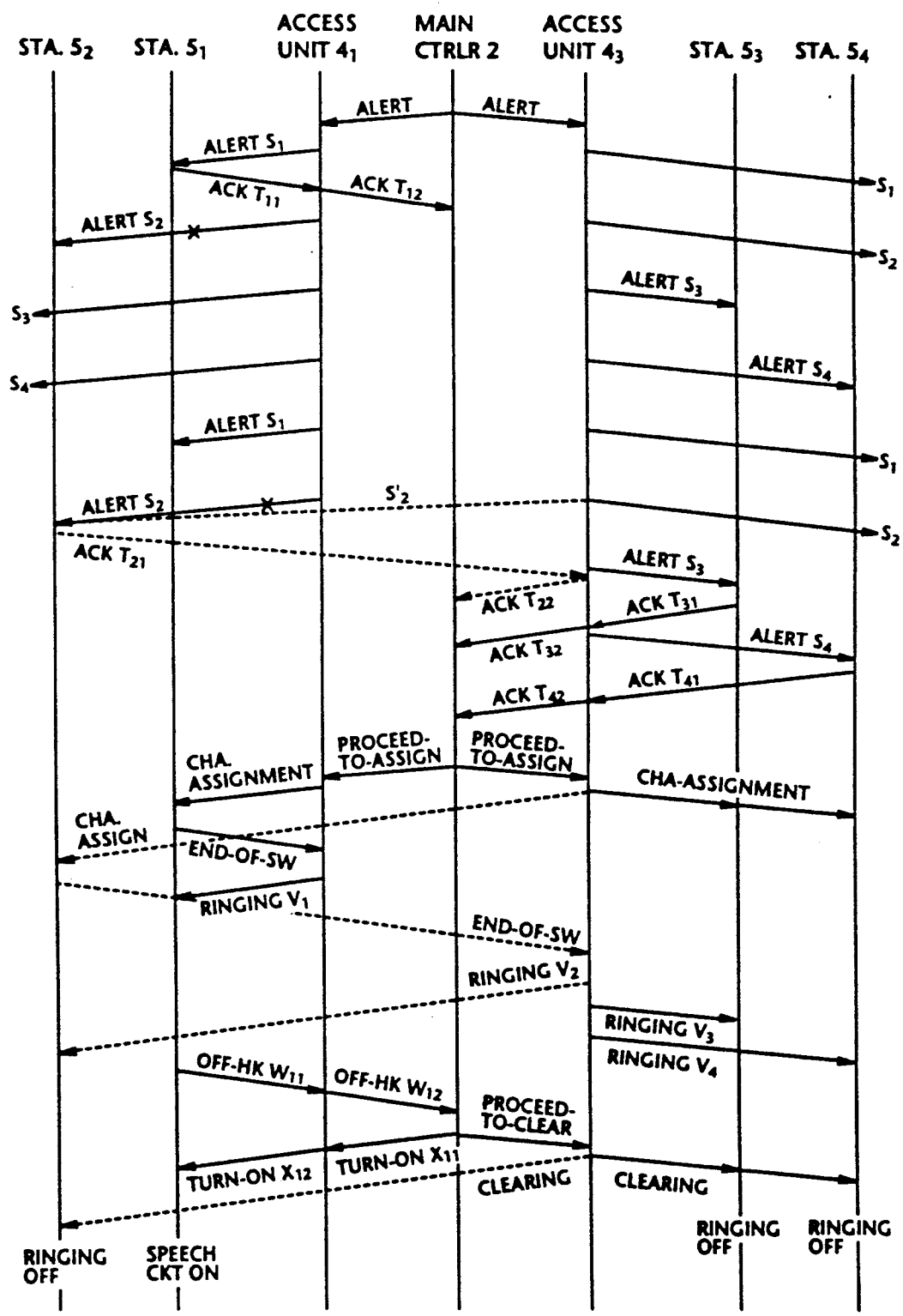
FIG. 8 shows a sequence of signals exchanged through the system in response to an incoming call from the switched telephone network.

Assume that station $5_2$ fails to detect alert signal $S_2$ as marked by X's in FIG. 8, but responds to alert signal $S'_2$ from access unit $4_3$ when it is switched to control channel C2 during a second sequence of alert signals sent from access unit $4_3$, so that it returns ACK $T_{21}$ to access unit $4_3$ where it is copied for transmission to main controller 2 as ACK $T_{22}$ (steps 64, 66, FIG. 6A).

Stations $5_3$ and $5_4$ then respond to alert signals $S_3$ and $S_4$ from access unit $4_3$ by returning ACK $T_{31}$ and $T_{41}$. These ACK signals are successively copied and transmitted from access unit $4_3$ as ACK $T_{32}$ and $T_{42}$ to main controller 2 (steps 68, 66).

If any of the cordless stations in the overlapping area $3_3$ fails to detect an alert signal addressed to it while executing steps 102 through 105, it switches to control channel C2 (step 106, FIG. 7B) to give it another chance to receive it.

In each access unit, ACK signals are received by the receiver 14 of the access unit and supplied to its control circuit 17 in which they are examined to see if they contain the same system identifier as that of the own key telephone system.

On receiving ACK signals from all standby cordless stations (step 48, FIG. 5), main controller 2 sends a proceed-to-assign signal to the selected access units $4_1$ and $4_3$ (step 50).

In response to the proceed-to-assign signal (step 69, FIG. 6A), access units $4_1$ and $4_3$ turn off their alert signal generator 18 (step 71) and make a search through their channel memory 32 to determine an idle speech channel, and broadcast a channel assignment signal (step 72) containing the assigned speech-channel identifier and the identifier of a cordless station which returned the ACK signal of the earliest arrival in each service area, (i.e., station $5_1$ for access unit $4_1$ and station $5_2$ for access unit $4_3$), switch to the assigned speech channel (step 74). Access unit $4_1$ now waits for an end-of-switching signal from cordless station $5_1$ (step 75) during timeout period $t_3$ and access unit $4_3$ waits for an end-of-switching signal from cordless station $5_2$.

On receiving the channel assignment signal from access unit $4_1$ (step 107, FIG. 7B), cordless station $5_1$ switches to the assigned speech channel (step 117) and checks to see if the station identifier contained in the channel assignment signal matches the own station identifiers (step 118). Thus, cordless station $5_1$ exits to step 119 to check to see if the assigned channel is idle, and if it is, returns an end-of-switching signal to access unit $4_1$ (step 120). After setting timeout period $t_8$, station $5_1$ waits for a ringing signal from access unit $4_1$ (steps 121 and 122, FIG. 7C). Likewise, cordless stations $5_2$, $5_3$ and $5_4$ switch to the assigned speech channel in response to the channel assignment signal sent on control channel C2, and an end-of-switching signal is returned from station $5_2$ to access unit $4_3$ (step 120, FIG. 7B). Stations $5_2$, $5_3$ and $5_4$ now wait for respective ringing signals from access unit $4_3$ after setting timeout period $t_8$.

In response to the respective end-of-switching signals from cordless stations $5_1$ and $5_2$ (step 75, FIG. 6A), access units $4_1$ and $4_3$ broadcast ringing signals each containing the system identifier and the respective station identifier (step 77, FIG. 6B), so that ringing signal $V_1$ is transmitted to station $5_1$ from access unit $4_1$ and ringing signals $V_2$, $V_3$ and $V_4$ are transmitted respectively to stations $5_2$, $5_3$ and $5_4$.

Figure 7C:
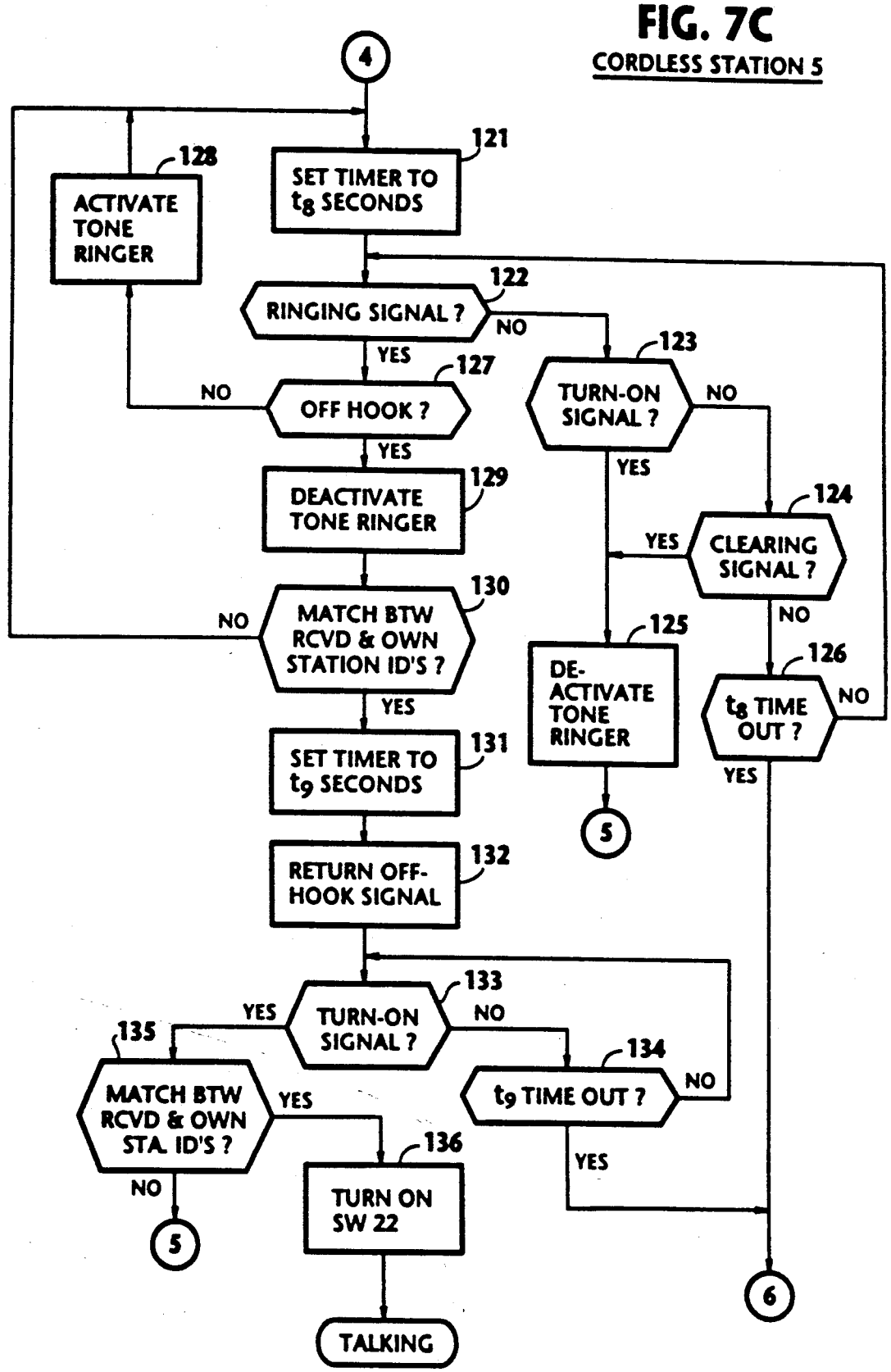

In response to each ringing signal, each cordless station activates its tone ringer 30 to alert the user (steps 122, 127 and 128, FIG. 7C). If cordless station $5_1$ goes off hook (step 127), it turns off its tone ringer (step 129), detects a match between the station identifier contained in the ringing signal and the own station identifier (step 130), and returns an off-hook signal $W_{11}$ to access unit $4_1$ (step 132) to wait for a turn-on signal.

On receiving the off-hook signal $W_{11}$ (steps 78 and 80, FIG. 6B), access unit $4_1$ returns a copy of the off-hook signal $W_{11}$ as an off-hook signal $W_{12}$ to main controller 2 (step 81).

Main controller 2 responds to the off-hook signal $W_{21}$ by returning a turn-on signal $X_{11}$ (steps 51 and 53, FIG. 5) to access unit $4_1$ and operating the switch 9 to establish a connection between line interface $8_1$ and local interface $10_1$, while transmitting a proceed-to-clear signal to access unit $4_3$.

In response to the turn-on signal $X_{11}$ (step 83, FIG. 6B), access unit $4_1$ broadcasts a copy $X_{12}$ of the turn-on signal $X_{11}$ (step 85) to enter a talking mode. Cordless station $5_1$ responds to this signal (step 133, FIG. 7C) by detecting a match between the station identifier contained in it and the own identifier (step 135) and turning on the switching circuit 22 to activate its speech circuit (step 136).

On the other hand, access unit $4_3$ broadcasts a clearing signal in response to proceed-to-clear signal (steps 78 and 79, FIG. 6B) and enters a standby state. Cordless stations $5_2$, $5_3$ and $5_4$ receive the clearing signal (step 124) and turn off their tone ringer (step 125) and switch to control channel C1 (step 95) to receive the next incoming call.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A cordless key telephone system for covering a plurality of service areas, wherein a frequency spectrum of radio signals used by said system is equally divided into a plurality of channels of equal bandwidth, comprising:
   a plurality of access units divided into groups corresponding respectively to said service areas, the access units of each group being located in the corresponding service area for broadcasting radio signals on a two-way control channel or on an assigned two-way speech channel, the access units of each group having a uniquely assigned control channel different in a frequency from the control channel of the other group;
   a plurality of cordless stations for exchanging radio signals with said access units, said cordless stations being respectively identified by unique station identifiers, each of said cordless stations being sequentially switchable to the control channel of one of said groups and to the control channel of the other group; and
   a main controller coupled to a switched telephone network for selecting one of the access units for each of said service areas in response to an incoming call from said network and transmitting a first alert signal to the selected access units;
   each of said access units comprising alert signal generator means for generating a recurrent sequence of second alert signals respectively containing the identifiers of standby cordless stations, and control means responsive to said first alert signal for activating said alert signal generator means to broadcast said recurrent sequence of said second alert signals, said control means being further responsive to receipt of an acknowledgment signal from one of said cordless stations for transmitting a copy of the acknowledgment signal to said main controller, responsive to receipt of a proceed-to-assign signal from said main controller for deactivating said alert signal generator means, for broadcasting a channel assignment signal indicating an assigned speech channel and for switching the access unit to the assigned speech channel, responsive to receipt of an end-of-switching signal from one of the cordless station for sequentially broadcasting ringing signals respectively containing the identifiers of the cordless stations which returned said first acknowledgement signals, responsive to receipt of an off-hook signal from one of the cordless stations for transmitting a copy of the off-hook signal to said main controller, and responsive to receipt of a turn-on signal from said main controller containing the identifier of a cordless station going off hook for broadcasting a copy of said turn-on signal,
   said main controller comprising means for transmitting said turn-on signal to one of the selected access units if said copy of the off-hook signal is received therefrom, and
   each of said cordless stations comprising means for transmitting said acknowledgment signal if the second alert signal containing the identifier of the station is detected in one of the sequentially switched control channels, switching the cordless station to the assigned channel in response to said channel assignment signal, transmitting said end-of-switching signal in response to the cordless station being switched to the assigned channel, transmitting said off-hook signal when the cordless station goes off hook in response to the ringing signal having the identifier of the station, and activating a speech circuit in response to receipt of said broadcast copy of the turn-on signal containing the identifier of the station,
   wherein odd-numbered ones of said divided channels are assigned to the access units of a first one of said groups as speech channels and an even-numbered one of said channels is assigned to the first group access units as a first control channel, and even-numbered ones of said channels are assigned to the access units of a second one of said groups as speech channels and an odd-numbered one of said channels is assigned to the second group access units as a second control channel, said first control channel being excluded from the speech channels assigned to the second group access units and said second control channel being excluded from the speech channels assigned to the first group access units.

2. A cordless key telephone system as claimed in claim 1, wherein said main controller comprises means for transmitting said proceed-to-assign signal if the number of the copies of the acknowledgment signals from said selected access units is equal to the number of all standby cordless stations.

3. A cordless key telephone as claimed in claim 1, wherein said odd-numbered speech channels are selected by avoiding channels having a channel number $(4n-2m+1)$ and a channel number $(4m-2n+1)$ if odd-numbered channels identified by numbers $(2n+1)$ and $(2m+1)$ are simultaneously in use, where n and m are positive integers, and said even-numbered speech channels are selected by avoiding channels having a channel number $(4n-2m)$ and a channel number $(4m-2n)$ if even-numbered channels identified by numbers 2n and 2m are simultaneously in use.

4. A cordless key telephone system for covering first and second service areas, wherein a frequency spectrum of radio signals used by said system is equally divided into a plurality of channels of equal bandwidth, comprising:
   a plurality of access units divided into first and second groups, the access units of the first group being located in the first service area for broadcasting a control signal on a first control channel which is an even-numbered one of said channels and broadcasting a speech signal on a first speech channel which is an odd-numbered one of said channels excluding a second control channel, the access units of the second group being located in the second service area for broadcasting a control signal on said second control channel which is an odd-numbered one of said channels and broadcasting a speech signal on a second speech channel which is an even-numbered one of said channels excluding said first control channel, each of said control signals containing a recurrent sequence of address signals;

a plurality of cordless stations switchable to the first control channel for detecting an address signal and subsequently switchable to the second control channel if said address signal is not detected in a first sequence for detecting said addressed signal in a second sequence; and a controller coupled to a switched telephone network for causing said access units of each group to broadcast a control signal in response to an incoming call from said network and establishing a connection between said network and one of said cordless stations via one of said access units.

5. A cordless key telephone system as claimed in claim 4, wherein said odd-numbered speech channels are selected by avoiding channels having a channel number $(4n-2m+1)$ and a channel number $(4m-2n+1)$ if odd-numbered channels identified by numbers $(2n+1)$ and $(2m+1)$ are simultaneously in use, where n and m are positive integers, and said even-numbered speech channels are selected by avoiding channels having a channel number $(4n-2m)$ and a channel number $(4m-2n)$ if even-numbered channels identified by numbers 2n and 2m are simultaneously in use.

* * * * *

UNITED STATES PATENT AND TRADEMARK OFFICE
CERTIFICATE OF CORRECTION

PATENT NO. : 5,283,817
DATED : February 1, 1994
INVENTOR(S) : Toshihiro Hara et al It is certified that error appears in the above-indentified patent and that said Letters Patent is hereby corrected as shown below:

On the title page, item [73] Assignee, please insert
—Nippon Telegraph and Telephone Corporation, Tokyo, Japan—.

Signed and Sealed this

Second Day of May, 1995

*Attest:*

BRUCE LEHMAN

*Attesting Officer*    *Commissioner of Patents and Trademarks*